United States Patent [19]

Funhoff et al.

[11] Patent Number: 5,399,286
[45] Date of Patent: Mar. 21, 1995

[54] POLYACETALS, PREPARATION THEREOF AND USE THEREOF IN DETERGENTS

[75] Inventors: Angelika Funhoff, Heidelberg; Hans-Peter Seelmann-Eggebert, Schriesheim; Heinrich Hartmann, Limburgerhof; Richard Baur, Mutterstadt; Volker Schwendemann, Neustadt; Alexander Kud, Eppelsheim; Werner Bertleff, Viernheim, all of Germany

[73] Assignee: BASF Aktiengesellschaft, Ludwigshafen, Germany

[21] Appl. No.: 104,154

[22] PCT Filed: Feb. 18, 1992

[86] PCT No.: PCT/EP92/00332
§ 371 Date: Aug. 20, 1993
§ 102(e) Date: Aug. 20, 1993

[87] PCT Pub. No.: WO92/15629
PCT Pub. Date: Sep. 17, 1992

[30] Foreign Application Priority Data

Feb. 28, 1991 [DE] Germany ............ 41 06 354.6

[51] Int. Cl.$^6$ ............................................. C11D 3/00
[52] U.S. Cl. ....................... 252/174.23; 252/174.21; 252/174.22; 252/174.24
[58] Field of Search ............... 252/174.23, 174.24, 252/174.21, 174.22

[56] References Cited

FOREIGN PATENT DOCUMENTS 0001004  3/1979  European Pat. Off. .

OTHER PUBLICATIONS

Journal of Polymer Science, Polymer Chemistry Edition, Bd. 17, Nr. 9, 9 Sep. 1979, New York, US pp. 2999–3007; K. Hashimoto E. A.: 'Equilibrium Anionic Polymerization of Beta–Methoxycarbonylpropionaldehyde'.

Macromolecular Syntheses. Bd. 7, 1979, New York US, pp. 23–25; K. Kbayashi E. A.: "Poly(Carbomethoxy–Ethyloxymethylene)".

Primary Examiner—Edward Cain
Attorney, Agent, or Firm—Oblon, Spivak, McClelland, Maier, & Neustadt

[57]  ABSTRACT

Polyacetals useful as detergent additives contain units of the formula

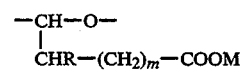

where
R is hydrogen, $C_1$–$C_4$-alkyl or COOM,
M is $C_1$–$C_4$-alkyl or an alkali metal, ammonium or alkanolamine group, and
m is from 0 to 9,
have K values (determined by the method of H. Fikentscher on the sodium salt in 1% strength by weight aqueous solution at 25° C. and pH 7) of at least 8.5, and are prepared by polymerizing compounds of the formula

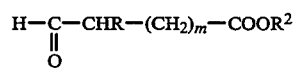

where
R is hydrogen, $C_1$–$C_4$-alkyl or COOM,
M is $C_1$–$C_4$-alkyl or an alkali metal, ammonium or alkanolamine group,
$R^2$ is $C_1$–$C_4$-alkyl, and
m is from 0 to 9,
in the presence of initiators and optionally comonomers with or without hydrolysis of the ester groups.

5 Claims, No Drawings

POLYACETALS, PREPARATION THEREOF AND USE THEREOF IN DETERGENTS

The present invention relates to polyacetals which as characteristic feature contain copolymerized units of the formula $$-\text{CH}-\text{O}- \atop |\ \text{CHR}-(\text{CH}_2)_m-\text{COOM} \qquad (I)$$

where
R is hydrogen, $C_1$–$C_4$-alkyl or COOM,
M is $C_1$–$C_4$-alkyl or an alkali metal, ammonium or alkanolamine group, and
m is from 0 to 9,
processes for preparing the polyacetals by polymerizing formyl esters in the presence of initiators, and the use of the polyacetals as additives in low-phosphate or phosphate-free detergents.

EP-B 0 001 004 discloses polymeric acetal carboxylates obtainable by polymerizing glyoxylic esters in the presence of initiators. These polymers contain as characteristic feature at least 4 units of the formula $$-\text{CH}-\text{O}- \atop |\ \text{COOM}$$

where M is an alkali metal, ammonium, $C_1$–$C_4$-alkyl or alkanolamine group.

These polymers are used as builders in detergents in amounts of at least 1% by weight. The known polymeric acetal carboxylates hydrolyze relatively rapidly in an acid medium to form components which are biodegradable. However, the polymers are not easy to prepare, since the monomers, ie. the formyl esters, must first be prepared by heating the hemiacetal ester of glyoxylic acid in the presence of phosphorus pentoxide and purified. The esters are then polymerized using suitable initiators, such as strong Lewis acids or the sodium salt of diethyl malonate. The resulting polymers are capped at the end groups with structures which impart to the polymer the stability in alkaline media required for use in detergents.

The polymerization of β-methoxycarbonylpropionaldehyde is known from Polm. Sci, Polymer Chemistry Edition 17 (1979), 2999–3007, and from Macromolecular Syntheses 7 (1979), 23–25.

It is an object of the present invention to provide novel detergent additives.

We have found that this object is achieved by the use of polyacetals containing copolymerized units of formula $$-\text{CH}-\text{O}- \atop |\ \text{H}-\text{C}-\text{R} \atop |\ (\text{CH}_2)_m \atop |\ \text{COOM} \qquad (I)$$

where
R is hydrogen, $C_1$–$C_4$-alkyl or COOM,
M is $C_1$–$C_4$-alkyl or an alkali metal, ammonium or alkanolamine group, and
m is from 0 to 9,
and optionally containing up to 50 mol % of at least one comonomer selected from the group consisting of the $C_1$–$C_{10}$-aldehydes, $C_2$–$C_4$-alkylene oxides, epihalohydrins, epoxysuccinic acid and compounds of the formula $$\text{H}-\text{C}-\text{CO}-\text{OR}^1, \atop \|\ \text{O}$$

where R′ is $C_1$–$C_4$-alkyl, as copolymerized units, and having K values (determined by the method of H. Fikentscher on the sodium salt in 1% strength by weight aqueous solution at 25° C. and pH 7) of at least 8.5, as additives in low-phosphate or phosphate-free detergents in amounts of from 0.1 to 30% by weight, based on the respective formulations.

The compounds of the formula II are known. Formyl esters of the formula II can be prepared for example by hydroformylation of monoethylenically unsaturated carboxylic esters with carbon monoxide and hydrogen at elevated temperatures and pressures; cf. for example J. Falbe, New Syntheses with Carbon Monoxide, Springer Verlag 1980, or J. Wender and P. Pino, Organic Synthesis via Metal Carbonyls, J. Wiley & Sons, 1977.

Preferred polyacetals contain units of the formula I where
R is H or COOM,
m is 0 to 2, and
M is methyl, ethyl, sodium, potassium, or an ammonium or ethanolamine group.

The polyacetals may contain up to 50, preferably up to 30, mol % of at least one comonomer selected from the group consisting of the $C_1$–$C_{10}$-aldehydes, $C_2$–$C_4$-alkylene oxides, epihalohydrins, epoxysuccinic acid and compounds of the formula $$\text{H}-\text{C}-\text{CO}-\text{OR}^1, \atop \|\ \text{O}$$

where $R^1$ is $C_1$–$C_4$-alkyl, as copolymerized units. The polyacetals which contain copolymerized units of the formula I have K values (determined by the method of H. Fikentscher on the sodium salt in 1% strength by weight aqueous solution at 25° C. and pH 7) of at least 8.5. Depending on the purity of the monomers which are used in the polymerization and the polymerization conditions, the polyacetals obtained have K values of up to 200 or higher. The number n of monomer units of the formula I in the polyacetals is at least 4 and can be up to about 500, and is preferably within the range from 4 to 120.

The polyacetals are prepared by polymerizing compounds of the formula $$\text{H}-\text{C}-\text{CHR}-(\text{CH}_2)_m-\text{COOR}^2 \qquad (II) \atop \|\ \text{O}$$

where
$R^2$ is preferably methyl or ethyl, R is preferably hydrogen, and m is preferably 1–4,
with or without one or more of the abovementioned comonomers. The polymerization is carried out in the absence or presence of a solvent. Suitable solvents are for example halogenated hydrocarbons, such as dichloromethane and trichloroethane, aromatic hydrocarbons, such as benzene, toluene, isopropylbenzene and xylene, ethers such as diethyl ether, dioxane and tetrahydrofuran or diethylene glycol dimethyl ether and also dimethylformamide and acetonitrile. The preferred solvents are ethers, acetonitrile and dichloromethane. The solvents should be completely or substantially anhydrous. Similarly, the monomers should be anhydrous. It is advisable to purify them by distillation before the polymerization. The water content of the polymerizing mixture is customarily below 0.1% by weight. The polymerization is preferably carried out under an inert gas atmosphere, for example under nitrogen, argon, helium or neon.

Suitable initiators are for example amines, such as triethylamine or the 2-hydroxypyridine-$H_2O$ complex, strong Lewis acids, such as boron trifluoride or boron trifluoride etherates, antimony pentafluoride, phosphorus pentafluoride, phosphorus pentoxide, tin chloride, tin alkyls, titanium halides and titanium alkyls, trifluoroacetic acid, alkali metal alcoholates, butyllithium, Grignard compounds, potassium carbonate and also sodium diethyl malonate, sodium dimethyl malonate and sodium diethyl methylmalonate. The polymerization can also be carried out in the presence of small amounts of hydroxyl and cyanide ions. The initiators are used in amounts of from 0.001 to 15 and preferably from 0.01 to 10, % by weight. The preferred polymerization initiator for preparing the polyacetals is phosphorous pentoxide.

To start the polymerization, the monomers, the initiator and, if used, the solvent are mixed. The substances can be mixed in any desired order, batchwise or continuously. The polymerization is customarily carried out within the temperature range from $-100°$ to $50°$ C., preferably from $-70°$ to $+30°$ C. The most preferred temperature range for the polymerization is from $-20°$ to $+30°$ C. Depending on the temperature and the initiator, the polymerization takes from some minutes to 8 days, preferably from 1 hour to 4 days.

If the monomers are polymerized in a solvent, the concentration of the monomers therein is from 5 to 95, preferably from 15 to 90, % by weight. After the polymerization the solvent is distilled off and the polymer is isolated. Since formyl esters are used as monomers, the polymers contain ester groups which can be converted into salts by reaction with alkali metal bases, ammonia or alkanolamines in an aqueous medium.

In the course of the polymerization in an organic solvent the growing polyacetal chain reacts with solvent molecules, which are added to the chain as end groups and thus stabilize the polyacetal against degradation at alkaline pH. Such end groups can be for example substituents which contain alkyl, alkenyl, phenyl, substituted phenyl and oxygen, for example oxyalkyl groups, such as methoxy, ethoxy and alkylcarboxyl groups. Suitable end groups for stabilizing the polyacetals are mentioned for example at length in EP-B-0 001 004 for other polyacetals. The particulars provided in said reference also apply to the polyacetals of the present invention. If the polymerization is carried out with phosphorus pentoxide as initiator, the polyacetals thus obtainable have phosphate end groups.

The polyacetals which contain copolymerized units of the formula I are used as additives in low-phosphate or phosphate-free detergent formulations in amounts of 0.5 to 20% by weight, based on the detergent formulation. If the substituent M in the formula I is a $C_1$-$C_4$-alkyl group, it is preferable to hydrolyze the ester groups of the polyacetals with alkali metal bases, ammonia or alkanolamines before the polyacetals are used as detergent additives. However, the polyacetals with ester groups can also be used directly in detergent formulations, since, during washing, the ester groups readily hydrolyze at an alkaline pH. However, the prior hydrolysis of the ester groups at up to $80°$ C., preferably at up to $60°$ C., is preferable. The resulting polyacetals, which carry salts of carboxyl groups, act as builders in detergent formulations; low molecular weight products are good dispersants. All the polyacetals of the present invention are biodegradable.

The above-described polyacetals are used as additives in pulverulent and liquid detergents, preferably in phosphate-free or low-phosphate detergents which contain not more than 25% by weight of sodium triphosphate. The polyacetals are used in amounts of from 0.1 to 30, preferably from 0.5 to 15, % by weight, based on the detergent formulation. The polyacetals to be used according to the present invention are good dispersants for clay in the washing liquor. This property is important because loamy soiling of textile material is very common. The polyacetals act as builders in detergent formulations, augment the detergency of the surfactants in detergents and also bring about during the wash a reduction in the incrustation of the washed textile material and make a significant contribution to the dispersal of soil in the washing liquor. Compared with known polymeric detergent additives based on copolymers of acrylic and maleic acid as described in EP-B-0 025 551, the polyacetals to be used according to the present invention have the advantage that they are biodegradable to a high extent, for example to more than 90%. Compared with the copolymers of maleic acid and acrylic acid described as detergent additives in EP-B-0 025 551, the polyacetals to be used according to the present invention show in particular improved compatibility in liquid detergent formulations.

The compositions of detergent formulations used for washing can differ greatly. The same is true of those used as cleaners. Both washing and cleaning detergent formulations customarily contain surfactants with or without builders. This is true not only of liquid but also of pulverulent washing and cleaning detergent formulations. Examples of the compositions of washing detergent formulations customary in Europe, the USA and Japan may be found for example in table form in Chemical and Engineering News 67 (1989), 35.

The above-described polyacetals are used according to the invention in detergents which contain up to 45% by weight of phosphate, although their use in detergents having a reduced phosphate content (which is to be understood as meaning a phosphate content of less than 25% by weight of sodium triphosphate) or in phosphate-free detergents is preferred. The polyacetals can be added to the detergent formulation in the form of granules, in the form of pastes, as a highly viscous mass, as a dispersion or as a solution in a solvent. The polyacetals can also be adsorbed on the surface of diluents, for example sodium sulfate, or builders (zeolites or bentonites) and also on other solid constituents of the detergent formulation.

The detergent formulations in question are pulverulent or liquid. They can differ in composition by region and according to the specific intended use.

Universal household detergents for drum type washing machines of the type widely used in Europe usually contain from 5 to 10% by weight of anionic surfactants, from 1 to 5% by weight of nonionic surfactants, from 1 to 5% by weight of foam regulators, such as silicone oils or soaps, from 0 to 40% by weight of a water softener, such as sodium carbonate or pentasodium triphosphate, which may be replaced in whole or in part by the compounds of the present invention, from 0 to 30% by weight of an ion exchanger such as zeolite A, from 2 to 7% by weight of sodium silicates as corrosion inhibitors, from 10 to 30% by weight of bleaching agents, such as sodium perborate or sodium percarbonate, organic per-acids and salts thereof, from 0 to 5% by weight of bleach activators, such as tetraacetylethylenediamine, pentaacetylglucose, hexaacetylsorbitol or acyloxybenzenesulfonate, stabilizers, such as magnesium silicate or ethylenediaminetetraacetate, grayness inhibitors, such as carboxymethylcellulose, methylalkylcelluloses and hydroxyalkylcelluloses, vinyl acetate-grafted polyglycols, oligomeric and polymeric terephthalic acid/ethylene glycol/polyethylene glycol esters, enzymes, fluorescent whitening agents, scents, fabric softeners, dyes, and diluents.

By contrast, the heavy duty detergents which are widely used in the USA, Japan and neighboring countries in tub type washing machines are usually free of bleaching agents, but on the other hand their anionics content is two to three times higher and they contain more wash alkalis, such as sodium carbonate and sodium silicates (in general up to 25% by weight) and naturally they also lack the bleach activators and bleach stabilizers. The levels of surfactants and other ingredients can be appreciably higher in the case of detergent concentrates, which are available with little or no diluent. Detergents for delicate and colored fabrics, wool detergents and hand washing detergents likewise usually contain no bleaching agents and only low levels of alkaline ingredients together with a correspondingly higher surfactant content.

Detergents for the commercial laundry sector are designed for the special conditions of industrial washing (soft water, continuous washing) which make it possible to customize the detergent to the type of article being washed and to the nature of the soil. Combinations are therefore used in which one ingredient predominates or others are completely absent only to be added separately when required. For this reason the surfactants, builders, alkalis and bleaching agents of these detergents vary within wide limits.

Suitable anionic surfactants for the aforementioned pulverulent washing detergents, or washing powders, are for example sodium alkylbenzenesulfonates, fatty alcohol sulfates and fatty alcohol polyglycol ether sulfates. Individual compounds of this type are for example $C_8$–$C_{12}$-alkylbenzenesulfonates, $C_{12}$–$C_{18}$-alkanesulfonates, $C_{12}$–$C_{16}$-alkyl sulfates, $C_{12}$–$C_{16}$-alkyl sulfosuccinates and sulfated ethoxylated $C_{12}$–$C_{16}$-alkanols. Other suitable anionic surfactants are sulfated fatty acid alkanolamines, α-sulfo fatty acid esters, fatty acid monoglycerides or reaction products of from 1 to 4 mol of ethylene oxide with primary or secondary fatty alcohols or alkylphenols. Further suitable anionic surfactants are fatty acid esters and fatty acid amides of hydroxy- or amino-carboxylic or -sulfonic acids, for example the fatty acid sarcosides, glycolates, lactates, taurides or isethionates. The anionic surfactants can be present in the form of the sodium, potassium and ammonium salts and also as soluble salts of organic bases, such as mono-, di- or triethanolamine or other substituted amines. The group of anionic surfactants also includes the ordinary soaps, ie. the alkali metal salts of natural fatty acids.

Suitable nonionic surfactants (nonionics) are for example addition products of from 3 to 40, preferably from 4 to 20, mol of ethylene oxide with 1 mol of fatty alcohol, alkylphenol, fatty acid, fatty amine, fatty acid amide or alkanesulfonamide. The abovementioned addition products of ethylene oxide may additionally contain up to 90% by weight, based on cocondensed ethylene oxide and propylene oxide, of propylene oxide as cocondensed units. The addition products which contain ethylene oxide and propylene oxide as cocondensed units may be modified by incorporation of butylene oxide as cocondensed units in amounts of up to 60% by weight, based on the total alkylene oxide content. Of particular importance are the addition products of from 5 to 16 mol of ethylene oxide with coconut or tallow fatty alcohols, with oleyl alcohol or with synthetic alcohols of from 8 to 18, preferably from 12 to 18, carbon atoms, and also with mono- or dialkylphenols having from 6 to 14 carbon atoms in the alkyl moieties. Besides these water-soluble nonionics, however, it is also possible to use water-insoluble or incompletely water-soluble polyglycol ethers having from 1 to 4 ethylene glycol ether moieties in the molecule, in particular if they are used together with water-soluble nonionic or anionic surfactants.

Further usable nonionic surfactants are the water-soluble addition products of ethylene oxide with propylene glycol ethers, alkylenediaminopolypropylene glycol and alkylpolypropylene glycols having 1 to 10 carbon atoms in the alkyl chain that contain from 20 to 250 ethylene glycol ether groups and from 10 to 100 propylene glycol ether groups, the polypropylene glycol ether chain acting as hydrophobe.

It is also possible to use nonionic surfactants of the type of the amine oxides or sulfoxides.

The foaming power of the surfactants can be increased or reduced by combining suitable surfactant types. A reduction can also be achieved by adding non-surfactant-like organic substances.

Further possible formulation ingredients of detergents include monomeric, oligomeric and polymeric phosphonates, ether sulfonates based on unsaturated fatty alcohols, eg. oleyl alcohol ethoxylate butyl ether and alkali metal salts thereof. These substances can be characterized for example with the aid of the formula $RO(CH_2CH_2O)_n$—$C_4H_8$—$SO_3Na$, where n is from 5 to 40 and R is oleyl.

The above-described polyacetals can also be used as additives in liquid washing detergents. Liquid detergents contain liquid surfactants or else solid surfactants which are soluble or at least dispersible in the detergent formulation. Suitable surfactants for this purpose are those products which are also used in pulverulent detergents but also liquid polyalkylene oxides or polyalkoxylated compounds. If the polyacetals are not directly miscible with the other constituents of the liquid detergent, it is possible to prepare homogeneous mixtures with the aid of a small amount of a solubilizer, for example water or a water-miscible organic solvent, eg. isopropanol, methanol, ethanol, glycol, diethylene glycol or triethylene glycol or corresponding propylene glycols. The amount of surfactant in liquid detergents is within the range from 4 to 50% by weight, based on the formulation as a whole, since in liquid detergents, too, the proportions of the ingredients vary within wide limits according to regional market conditions or the intended application.

Liquid detergents may contain water in amounts of from 10 to 60, preferably from 20 to 50, % by weight. However, they can also be free of water.

Water-free liquid detergents may also contain suspended or dispersed peroxo compounds for bleaching. Examples of suitable peroxo compounds are sodium perborate, peroxocarboxylic acids and polymers having some peroxo-containing groups. Liquid detergents may also contain hydrotropes. These are compounds such as 1,2-propanediol, cumenesulfonate and toluenesulfonate. If such compounds are used for modifying a liquid detergent, their amount is from 2 to 5% by weight, based on the total weight of the liquid detergent. In many cases an addition of complexing agents has also proved advantageous for modifying pulverulent and liquid detergents. Complexing agents are for example ethylenediaminetetraacetic acid, nitrilotriacetate and isoserinediacetic acid and also phosphonates, such as aminotrismethylenephosphonic acid, hydroxyethanediphosphonic acid, ethylenediaminetetraethylenephosphonic acid and salts thereof. Complexing agents are used in amounts of 0 to 10% by weight, based on the detergent. The detergents may also contain citrates, di- or triethanolamine, or opacifiers, fluorescent whitening agents, enzymes, perfume oils and dyes. These substances, if they are used for modifying a liquid detergent, together account for up to 5% by weight. The detergents are preferably phosphate-free. However, they may also contain phosphates, for example pentasodium triphosphate and/or tetrapotassium pyrophosphate. If phosphates are used, they account for up to 45, preferably up to 25, % by weight of the total formulation of the detergent.

The polyacetals to be used according to the present invention can also interact with other known detergent additives (for example grayness inhibitors, clay dispersants and substances which augment the primary detergency, color transfer inhibitors, bleach activators) in pulverulent and liquid detergents (phosphate-containing and phosphate-free) to produce synergistic effects enhancing not only the dispersal of particulate soil but also the effectiveness of the other detergent additive.

The percentages in the examples are by weight. The K values of the polyacetals were determined by the method of H. Fikentscher, Cellulosechemie, 13 (1932), 58–64, 71–74, on the sodium salts of the polyacetals in a 1% strength by weight aqueous solution at 25° C. and pH 7.

EXAMPLES

Example 1

A 100 ml capacity flask was charged with 50 ml of tetrahydrofuran and 2 g (14.1 mmol) of phosphorus pentoxide under argon. 22.2 g (191.4 mmol) of methyl β-formylpropionate were added at 20° C. over 15 minutes, and the reaction mixture was then stirred at 20° C. for 92 hours. Then the solvent was removed under reduced pressure. The residue was a pale yellow porridge, to which 25% strength aqueous sodium hydroxide solution was gradually added with ice-cooling. The reaction mixture was then left at pH 8–9 for 10 hours, and then concentrated, and the polymer was precipitated with ethanol. The poly-β-formylpropionic acid was obtained in the form of the sodium salt as a white powder, which was dried under reduced pressure. The polymer had a K value of 18.7.

Example 2

The flask described in Example 1 was charged with 40 ml of dichloromethane and 22.2 g (191.4 mmol) of methyl β-formylpropionate, and the contents were cooled down to −70° C. under argon. Then 0.3 g (2.1 mmol) of boron trifluoride etherate was added, and the reaction mixture was stirred at −70° C. for 4 hours. After the polymerization had ended, 2.3 g (28.9 mmol) of pyridine were added, the reaction mixture was warmed to room temperature, and the solvent was distilled off under reduced pressure. This left a clear colorless product, which was cooled down to 0° C. and gradually admixed with 25 g (156 mmol) of 25% strength aqueous sodium hydroxide solution. The reaction mixture was left at 0° C. for 5 hours, then warmed to room temperature and left at that temperature for a further 18 hours. A beige polymer salt is obtained on precipitation in ethanol. The polymer had a K value of 10.7.

Example 3

The apparatus described in Example 1 was charged with 0.27 g (1.9 mmol) of phosphorus pentoxide and 50 ml of tetrahydrofuran under argon. 22.2 g (191.4 mmol) of methyl β-formylpropionate were then slowly added at 20° C., and the reaction mixture was stirred at 20° C. for 96 hours. The solvent was then distilled off under reduced pressure, 10 ml of dichloromethane were added, followed by 3.7 ml of 2N aqueous sodium hydroxide solution and 30 ml of saturated sodium bicarbonate solution, and the mixture was stirred for 15 minutes. The aqueous phase was then decanted off, and the organic phase was washed twice with 30 ml of saturated aqueous sodium bicarbonate solution each time. The organic phase was then cooled down to 0° C., admixed with 25 ml of 10N aqueous sodium hydroxide solution, and stirred at room temperature for 2 hours. A pale yellow oil was obtained, to which 40 ml of ethanol were added, and the mixture was then stirred for 30 minutes. The polymer came down as a solid precipitate. The supernatant solution was decanted off, the precipitate was dissolved, and the polymer was precipitated with methanol. The poly-β-formylpropionic acid thus obtained in the form of the sodium salt was a beige powder and had a K value of 10.9.

Example 4

The apparatus specified in Example 1 was charged with 4.0 g (28.2 mmol) of phosphorus pentoxide and 50 ml of tetrahydrofuran under argon. 22.2 g (191.4 mmol) of methyl β-formylpropionate were then gradually added, and the reaction mixture was stirred at 20° C. for 72 hours. The solvent was then distilled off under reduced pressure, and the residue was admixed with 54.4 ml of 2N aqueous sodium hydroxide solution, 30 ml of saturated sodium bicarbonate solution and 150 ml of water. The polymer was filtered off with suction and washed twice with 30 ml of saturated aqueous sodium bicarbonate solution each time and then once with water. The polymer was then cooled down to 0° C. and saponified dropwise with 25 ml of 10N aqueous sodium hydroxide solution at 25° C. Poly-β-formylpropionic acid was obtained in the form of the polysodium salt, which was precipitated with ethanol as a pale yellow powder of K 15.3.

Example 5

The apparatus described in Example 1 was charged with 23.2 g (0.20 mol) of methyl β-formylpropionate and 4.5 ml of dichloromethane under argon, and the contents were cooled down to 0° C. 150 μl of a 0.05N solution of sodium diethyl malonate in tetrahydrofuran was then added dropwise, and the reaction mixture was stirred at 0° C. for 30 minutes. Thereafter the same amount of sodium diethyl malonate in tetrahydrofuran was added (making a total of 0.015 mmol), and the mixture was stirred at 0° C. for 20 hours. Then 4.6 g (60.5 mmol) of dimethoxymethane, 4.4 g (31 mmol) of phosphorus pentoxide and then once more the same amount of dimethoxymethane were added. The mixture was then stirred at 0° C. for 20 hours and thereafter admixed with 60 ml of 2N sodium hydroxide solution. The aqueous phase was decanted off, and the organic phase was washed 3 times with 50 ml of saturated aqueous sodium bicarbonate solution each time. The residue was admixed with 25 g of 25% strength aqueous sodium hydroxide solution, added dropwise, the temperature rising to not more than 40° C., and the mixture stirred for 2 hours. 40 ml of methanol were added, and the mixture was concentrated under an aspirator vacuum and then admixed with ethanol. This produced poly-β-formylpropionic acid in the form of the polysodium salt as a white powder of K 11.

Example 6

The apparatus described in Example 1 was charged with 2.0 g (14.1 mmol) of phosphorus pentoxide under argon and admixed with 50 ml of tetrahydrofuran by stirring. 22.72 g (195.9 mmol) of methyl α-formylpropionate were then gradually added at room temperature, and the reaction mixture was stirred at 20° C. for 72 hours. The solvent was then distilled off under reduced pressure, and 27 ml of 2N sodium hydroxide solution were added to the residue. This mixture was stirred for 15 minutes, then 50 ml of water were added, and the supernatant solution was decanted off. The residue was washed with 100 ml of saturated aqueous sodium bicarbonate solution and then with 100 ml of water. It was then admixed with 20 ml of 10N sodium hydroxide solution with ice-cooling, and stirred at room temperature for 2 hours. The polymer was precipitated with 1:1 w/w ethanol/acetone and then dried. This produced poly-α-formylpropionic acid in the form of the polysodium salt having a K value of 14.2.

Example 7

The apparatus described in Example 1 was charged with 2.0 g (14.1 mmol) of phosphorus pentoxide and 50 ml of tetrahydrofuran under argon, slowly followed by 24.74 g (142.2 mmol) of dimethyl formylsuccinate. The reaction mixture was then stirred at room temperature for 120 hours. This produced a viscous oil, which was decanted off leaving a small amount of white solid. The white solid was washed twice with 40 ml of tetrahydrofuran each time, and the wash liquors were combined with the decanted oil. The solvent was then distilled off under reduced pressure, and the residue was cooled down to 0° C. Sufficient 25% strength aqueous sodium hydroxide solution was then added at that temperature until a pH of 8.5 had been obtained. Then 20 ml of water were added, and the mixture was left to stand at 0° C. for 18 hours. The polymer was precipitated from a mixture of acetone and ethanol in a volume ratio of 9:1. It had a K value of 12.4.

Comparative Example 1

(in accordance with Example 2 of U.S. Pat. No. 4,224,420)

The apparatus described in Example 1 was charged with 8 ml of freshly distilled dichloromethane and 16 ml (20.0 g, 0.22 mol) of methyl glyoxylate, and the contents were cooled down to 0° C. At that temperature 0.2 g of regenerated molecular sieve (3 Å) was added. After the reaction had ended, the reaction mixture was warmed to room temperature. 7 ml of ethyl vinyl ether were added dropwise, and the solution was then stirred overnight. 30 ml of toluene were added, the mixture was stirred for 10 minutes, and the top phase was then decanted off. The wash was repeated with 20 ml of toluene. This left a residue of a white viscous product, which was admixed with 20 ml of 0.1N sodium hydroxide solution and stirred for 20 minutes. The top phase was again decanted off. Then 20 ml of 10M sodium hydroxide solution were added dropwise, and the internal temperature rose to not more than 45° C. The saponification was carried out for 90 minutes, and the product was precipitated in methanol. The white powder obtained was dried under reduced pressure. It had a K value of 11.9.

Comparative Example 2

Sodium salt of monomeric β-formylpropionic acid

In the apparatus described in Example 1, 20 ml of the monomer methyl β-formylpropionate were cooled down to 0° C. and admixed dropwise with 25% strength sodium hydroxide solution until a pH of from 8 to 9 had been reached. The mixture was stirred at room temperature for a further 15 h, and the sodium salt was then precipitated from ethanol and dried under reduced pressure.

Example 8

The apparatus described in Example 1 was charged with 2.0 g (14.1 mmol) of phosphorus pentoxide and 50 ml of diethylene glycol dimethyl ether were added. 20 ml (22.2 g, 191.4 mmol) of methyl β-formylpropionate were added dropwise over 15 minutes and the reaction mixture was left at room temperature for 96 h. It was then cooled down to 0° C. and gradually admixed with 30 g of 25% strength sodium hydroxide solution. After 6 h at room temperature the phases which had formed were separated, and the bottom phase was precipitated in ethanol. The product, which had a K value of 9.4, was dried under reduced pressure.

Example 9

The apparatus described in Example 1 was charged with 0.81 g (5.7 mmol) of phosphorus pentoxide under argon, and 50 ml of dimethylglycol were added. 20 ml (22.2 g, 191.4 mmol) of methyl β-formylpropionate were added over 5 minutes, and the reaction mixture was stirred at room temperature for 94 h. After cooling down to 0° C., the reaction mixture was admixed dropwise with 25 ml of 25% strength sodium hydroxide solution and left at room temperature for 5 h. The resulting 2 phases were separated, the bottom phase was precipitated in 2:1 methanol/acetone, and the precipitate was dried under reduced pressure. The product had a K value of 10.2.

Example 10

The apparatus described in Example 1 was charged with 0.27 g (1.9 mmol) of phosphorus pentoxide under argon, and 20 ml (22.2 g, 191.4 mmol) of methyl β-formylpropionate were then added with stirring. An exothermic reaction took place. The reaction mixture was left at room temperature for 90 h and then decanted off from the sediment, and the oily phase was admixed at 0° C. with 25 ml of 25% strength sodium hydroxide solution, added dropwise. After stirring at room temperature for 5 hours, the product was precipitated in 2:1 methanol/acetone. After filtration and drying under reduced pressure the K value of the product was found to be 9.0.

Example 11

The apparatus described in Example 1 was charged with 20 ml (22.2 g, 191.4 mmol) of methyl β-formylpropionate under argon, and 3.3 µl of triethylamine were added. The mixture was stirred at room temperature for 3 h and then at 50° C. for 47 h, at which point a further 3.3 µl of triethylamine were added. The reaction temperature was raised to 90° C. and the mixture was left at that temperature for 27 h. It was then cooled down to 0° C., admixed dropwise with 50% strength sodium hydroxide solution and subsequently stirred for 5 h. The product was precipitated in methanol, filtered off and dried under reduced pressure. The K value was 9.9.

Example 12

The apparatus described in Example 1 was charged with 2.0 g (14.1 mmol) of phosphorus pentoxide, and 50 ml of dimethylglycol were added. 20 ml (22.2 g, 191.4 mmol) of methyl β-formylpropionate were added dropwise over 15 minutes, and the reaction mixture was left at room temperature for 96 h. It was cooled down to 0° C. and admixed dropwise with 30 g of 25% strength sodium hydroxide solution, and then stirred at room temperature for 6 h. The phases were then separated, and the bottom phase was precipitated in ethanol. The product was dried under reduced pressure and was found to have a K value of 9.6.

Example 13

The apparatus described in Example 1 was charged with 2.0 g (14.1 mmol) of phosphorus pentoxide and 50 ml of tetrahydrofuran under argon, and 20 ml (22.2 g, 191.4 mmol) of methyl β-formylpropionate were added while the batch was cooled down to −70° C. It was then stirred at −70° C. for 16 h and then warmed to 0° C., at which point 25 ml of 25% strength sodium hydroxide solution were added dropwise. After stirring at room temperature for 5 hours, the tetrahydrofuran solvent was distilled off under reduced pressure, and the product was precipitated in methanol. After filtration, the product was dried under reduced pressure. The white powder had a K value of 10.9.

Example 14

The apparatus described in Example 1 was charged with 2.0 g (14.1 mmol) of phosphorus pentoxide and 50 ml of dioxane, and 20 ml (22.2 g, 191.4 mmol) of methyl β-formylpropionate were added. Following a reaction time of 72 h at room temperature, 25 ml of 25% strength sodium hydroxide solution were added dropwise. The resulting 2 phases were separated, and the bottom phase was precipitated in 2:1 methanol/acetone. The product was dried under reduced pressure and was found to have a K value of 9.5.

Example 15

The apparatus described in Example 1 was charged with 2.0 g (14.1 mmol) of phosphorus pentoxide and 50 ml of toluene, and 20 ml (22.2 g, 191.4 mmol) of methyl β-formylpropionate were added. Following a reaction time of 72 h at room temperature, 25 ml of 25% strength sodium hydroxide solution were added dropwise. The resulting 2 phases were separated, and the bottom phase was precipitated in 2:1 methanol/acetone. The product was dried under reduced pressure and was found to have a K value of 9.4.

APPLICATION EXAMPLES

Clay Dispersion

The removal of particulate soil from fabric surfaces is augmented by the presence of polyelectrolytes. Stabilizing the dispersion which forms as the particles are detached from the fabric surface is an important function of these polyelectrolytes. The stabilizing effect of the anionic dispersants is due to the fact that, as a consequence of the adsorption of dispersant molecules on the surfaces of the solids, the surface charge thereof and hence the repulsion increases. Further factors having a bearing on the stability of a dispersion include steric effects, the temperature, the pH and the electrolyte concentration.

The clay dispersion (CD) test described hereinafter can be used to assess the dispersing power of various polyelectrolytes in a simple manner.

CD Test

Particulate soil is represented by finely ground china clay SPS 151.1 g of clay is intensively dispersed in 98 ml of water in a 100 ml cylinder in the presence of 1 ml of a 0.1% strength sodium salt solution of the polyelectrolyte for 10 minutes. Immediately after the stirring has been stopped, a sample of 2.5 ml is removed from the center of the cylinder and diluted to 25 ml and the turbidity measured in a turbidimeter. After the dispersion has stood for 30 and 60 minutes, further samples are taken and again measured in the turbidimeter. The turbidity of the dispersion is reported in nephelometric turbidity units (NTUs). The less the dispersion settles on storage, the higher the measured turbidity values are and the stabler the dispersion is. The second physical parameter determined is the dispersion constant $\tau$, which describes the time course of the sedimentation process. Since the sedimentation process approximates to a monoexponential time law, $\tau$ indicates the time within which the turbidity decreases to 1/e-th of the original level at time t=0.

The higher value of $\tau$, the slower the rate of sedimentation in the dispersion.

The CD test was carried out for the sodium salts of the polymers obtained as described in Examples 8 to 15. The results are indicated below in the table together with the results of the comparative examples.

|  | Reaction product obtained as described in | Turbidity after storage [NTU] | | | Dispersion constant $\tau$ [min] |
|---|---|---|---|---|---|
|  |  | at once | 30 min | 60 min |  |
| Example | Example |  |  |  |  |
| 16 | 8 | 680 | 600 | 530 | 240.7 |
| 17 | 9 | 680 | 630 | 570 | 346.9 |

| Reaction product obtained as described in | Turbidity after storage [NTU] at once | 30 min | 60 min | Dispersion constant $\tau$ [min] |
|---|---|---|---|---|
| 18 | 10 | 730 | 640 | 600 | 341.4 |
| 19 | 11 | 700 | 630 | 550 | 253.7 |
| 20 | 12 | 690 | 620 | 580 | 362.7 |
| 21 | 13 | 740 | 610 | 540 | 197.4 |
| 22 | 14 | 740 | 620 | 580 | 300.7 |
| 23 | 15 | 750 | 640 | 600 | 319.3 |
| Comparative Example | Comparative Example | | | | |
| 1 | 1 | 570 | 470 | 400 | 169.8 |
| 2 | 2 | 630 | 40 | 35 | 36.2 |
| 3 | — | 600 | 37 | 33 | 41.4 |

The measurements reveal that the polyacetals to be used according to the present invention give dispersions which, after standing for 60 minutes, have distinctly higher turbidity values than the reported comparisons. Together with the distinctly higher dispersion constants this means that the polyacetals to be used according to the present invention are better able to disperse clay and at the same time make it possible to prepare dispersions having a longer storage life. Applied to washing processes, this means an improvement in the primary detergency (better soil removal) and at the same time, due to formation of stable dispersions, a reduced danger of the soil present in the washing liquor from the first part of the operation being redeposited on the washed fabric.

We claim:

1. A detergent comprising surfactants and other conventional additives, which contains, 0,1 to 30% by weight of a polyacetal which contains copolymerized units of the formula

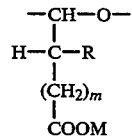

where
R is hydrogen, $C_1$–$C_4$-alkyl or COOM,
M is $C_1$–$C_4$-alkyl or an alkali metal, ammonium or alkanolamine group, and
m is from 0 to 9,
and has a K value (determined by the method of H. Fikentscher on the sodium salt in 1% strength by weight aqueous solution at 25° C. and pH 7) of at least 8.5.

2. A detergent as claimed in claim 1, wherein the polyacetal contains copolymerized units of the formula I, wherein
R is H or COOM,
m is 0 to 2 and
M is methyl, ethyl, sodium, potassium, or an ammonium or ethanolammonium group.

3. A detergent as claimed in claim 1, wherein the polyacetal is methyl $\beta$-formylpropionate.

4. A detergent as claimed in claim 1, wherein the polyacetal is dimethyl formylsuccinate.

5. A detergent as claimed in claim 1, wherein the polyacetal contains, as copolymerized units, up to 50 mol.-% of at least one comonomer selected from the group consisting of $C_1$–$C_{10}$-aldehydes, $C_2$–$C_4$-alkylene oxides, epihalohydrins, epoxysuccinic acid and compounds of the formula

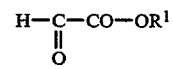

where
$R^1$ is $C_1$–$C_4$-alkyl.

* * * * *